(12) United States Patent
Datta et al.

(10) Patent No.: US 9,165,375 B2
(45) Date of Patent: *Oct. 20, 2015

(54) AUTOMATICALLY DETERMINING FIELD OF VIEW OVERLAP AMONG MULTIPLE CAMERAS

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,347

(22) Filed: Nov. 4, 2014

(65) Prior Publication Data
US 2015/0055830 A1    Feb. 26, 2015

Related U.S. Application Data

(63) Continuation of application No. 13/852,011, filed on Mar. 28, 2013, now Pat. No. 8,913,791.

(51) Int. Cl.
*G06K 9/00*    (2006.01)
*G06T 7/20*    (2006.01)

(52) U.S. Cl.
CPC .............. *G06T 7/2093* (2013.01); *G06T 7/2046* (2013.01); *G06T 2207/10016* (2013.01); *G06T 2207/20144* (2013.01); *G06T 2207/30232* (2013.01); *G06T 2207/30252* (2013.01)

(58) Field of Classification Search
CPC .............. G06T 7/004–7/0048; G06K 9/00201; G06K 9/00624–9/00845
USPC ......... 382/103, 154, 190, 194, 199, 225, 284, 382/285, 294
See application file for complete search history.

(56) References Cited

U.S. PATENT DOCUMENTS 6,690,374 B2    2/2004 Park et al.
6,856,344 B2    2/2005 Franz (Continued)

OTHER PUBLICATIONS

Khan, Javed and Shah, Tracking in Uncalibrated Cameras with Overlapping Field of View, Performance Evaluation of Tracking and Surveillance PETS 2001 (with CVPR 2001), Kauai, Hawaii, Dec. 9, 2001 (Oral presentation).

(Continued)

*Primary Examiner* — Brian Le
(74) *Attorney, Agent, or Firm* — Patrick J. Daugherty; Driggs, Hogg, Daugherty & Del Zoppo Co., LPA

(57) ABSTRACT

Field of view overlap among multiple cameras are automatically determined as a function of the temporal overlap of object tracks determined within their fields-of-view. Object tracks with the highest similarity value are assigned into pairs, and portions of the assigned object track pairs having a temporally overlapping period of time are determined. Scene entry points are determined from object locations on the tracks at a beginning of the temporally overlapping period of time, and scene exit points from object locations at an ending of the temporally overlapping period of time. Boundary lines for the overlapping fields-of-view portions within the corresponding camera fields-of-view are defined as a function of the determined entry and exit points in their respective fields-of-view.

20 Claims, 3 Drawing Sheets

(56) References Cited

U.S. PATENT DOCUMENTS

| | | | |
|---|---|---|---|
| 6,873,924 | B1 | 3/2005 | Welles, II et al. |
| 7,149,325 | B2 | 12/2006 | Pavlidis et al. |
| 7,286,157 | B2 | 10/2007 | Buehler |
| 7,355,690 | B2 | 4/2008 | Elyasaf et al. |
| 7,720,257 | B2 | 5/2010 | Morellas et al. |
| 7,732,769 | B2 * | 6/2010 | Snider et al. ............... 250/336.1 |
| 8,013,899 | B2 | 9/2011 | Gillard et al. |
| 8,274,550 | B2 | 9/2012 | Steuart, III et al. |
| 2005/0265582 | A1 | 12/2005 | Buehler et al. |
| 2007/0291143 | A1 | 12/2007 | Barbieri |
| 2009/0268033 | A1 | 10/2009 | Ukita |
| 2010/0157064 | A1 | 6/2010 | Cheng et al. |
| 2010/0231723 | A1 | 9/2010 | Nam et al. |
| 2011/0141288 | A1 | 6/2011 | Huang et al. |
| 2012/0046044 | A1 | 2/2012 | Jamtgaard et al. |
| 2012/0288140 | A1 * | 11/2012 | Hauptmann et al. .......... 382/103 |

OTHER PUBLICATIONS

Stein, Romano and Lee, Monitoring Activities from Multiple Video Streams: Establishing a Common Coordinate Frame (Aug. 2000), IEEE Trans. on Pattern Recognition and Machine Intelligence, 22(8): 758-768.

U.S. Appl. No. 13/852,011, filed Mar. 28, 2013; GAU 2666, Confirmation No. 1580.

Notice of Allowance (Mail Date Aug. 5, 2014) for U.S. Appl. No. 13/852,011, filed Mar. 28, 2013; GAU 2666, Confirmation No. 1580.

* cited by examiner

AUTOMATICALLY DETERMINING FIELD OF VIEW OVERLAP AMONG MULTIPLE CAMERAS

FIELD OF THE INVENTION

The present invention relates to image analytics technology. More specifically, the present invention relates to applying computer vision techniques to automatically determine commonalities in scene data of different cameras.

BACKGROUND

Automated systems use video analytics to process video data to identify and distinguish objects within image data of a scene acquired by a camera or other visual data acquisition device or scanner. In some examples, systems use background subtraction (BGS) mask processes to distinguish object items as foreground features in the video data, objects that are distinct from a background model of the image data and discernible within video imagery. Information processing systems receive images or image frame data captured by video cameras or other image capturing devices, wherein individual frames of video data are processed or analyzed by an object detection system in the information processing system to identify, distinguish and track the presence and movement of objects detected within the video data over time. Some examples use object detectors configured to detect objects having certain attributes distinguishable from other objects, for example using vehicle or pedestrian detectors to recover and distinguish respective vehicle or pedestrian objects in the scene from other moving or stationary objects or scene elements.

BRIEF SUMMARY

In one aspect of the present invention, a method for automatically determining field of view overlap among multiple cameras as a function of the temporal overlap of object tracks includes determining values of similarity for potential pairings of object tracks in fields-of-view of two cameras. The object tracks define movements of tracked objects over time through scene image data of a camera field of view. The object tracks with highest similarity value are assigned into pairs. If portions of the assigned object track pairs have a temporally overlapping period of time they are determined to correspond to overlapping portions of the fields-of-view of the paired cameras. On the assigned object track pairs corresponding to the overlapping fields-of-view scene entry points are determined from object locations on the tracks at a beginning of the temporally overlapping period of time, and scene exit points from the object locations on the tracks at an ending of the temporally overlapping period of time. Boundary lines for the overlapping fields-of-view portions within the corresponding camera fields-of-view are defined as a function of the determined entry and exit points in their respective fields-of-view.

In another aspect, a system has a processing unit, computer readable memory and a computer-readable storage medium with program instructions, wherein the processing unit, when executing the stored program instructions, determines values of similarity for potential pairings of object tracks in fields-of-view of two cameras. The object tracks define movements of tracked objects over time through scene image data of a camera field of view. The object tracks with highest similarity value are assigned into pairs. If portions of the assigned object track pairs having a temporally overlapping period of time they are determined to correspond to overlapping portions of the fields-of-view of the paired cameras. On the assigned object track pairs corresponding to the overlapping fields-of-view scene entry points are determined from object locations on the tracks at a beginning of the temporally overlapping period of time, and scene exit points from the object locations on the tracks at an ending of the temporally overlapping period of time. Boundary lines for the overlapping fields-of-view portions within the corresponding camera fields-of-view are defined as a function of the determined entry and exit points in their respective fields-of-view.

In another aspect, a computer program product has a computer-readable storage device with computer readable program code embodied therewith, the computer readable program code comprising instructions that, when executed by a computer processing unit, cause the computer processing unit to determine values of similarity for potential pairings of object tracks in fields-of-view of two cameras. The object tracks define movements of tracked objects over time through scene image data of a camera field of view. The object tracks with highest similarity value are assigned into pairs. If portions of the assigned object track pairs have a temporally overlapping period of time they are determined to correspond to overlapping portions of the fields-of-view of the paired cameras. On the assigned object track pairs corresponding to the overlapping fields-of-view scene entry points are determined from object locations on the tracks at a beginning of the temporally overlapping period of time, and scene exit points from the object locations on the tracks at an ending of the temporally overlapping period of time. Boundary lines for the overlapping fields-of-view portions within the corresponding camera fields-of-view are defined as a function of the determined entry and exit points in their respective fields-of-view.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
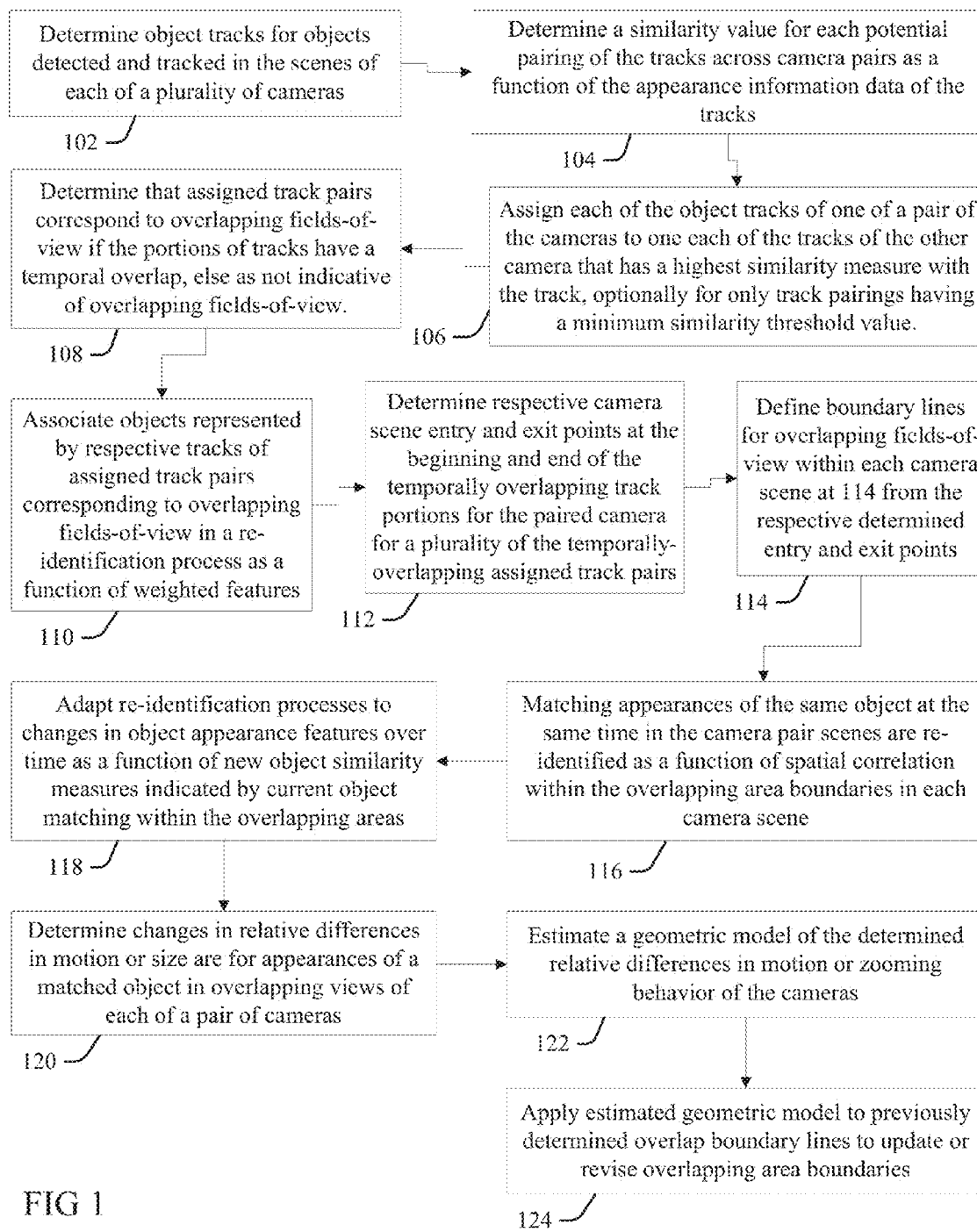
FIG. 1 is a block diagram illustration of a method, system or process according to the present invention for automatically determining field of view overlap among multiple cameras as a function of the temporal overlap of paired portions of object tracks.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Video analytics systems may use background subtraction (BGS) to distinguish foreground objects of interest from background models defined with respect to visual data in video input data. Such BGS systems are sometimes deployed to determine and track pedestrian and vehicle movements and activities in a variety of different scenes and contexts, including public roadways, mass transit stations, etc. Aspects of the present invention may be deployed in automobile and traffic monitoring implementations, for example in order to track in real-time one or more moving automobiles, or an overall, aggregate traffic flow of many vehicles, traversing one or more streets. Implementations may be useful to track certain vehicles, as well as to determine the occurrence congestion patterns during certain time periods (for example, morning, afternoon or evening rush hours or other peak traffic flow events), or how many vehicles or types of vehicles are traveling through a particular road at any time. Non-vehicle object tracking aspects include tracking pedestrians or animals as discussed above. Some aspects track and analyze shopper behavior recorded across multiple or aggregate cameras in retail shopping locations, in some examples to determine appropriate personalized offers or discounts based on real-time behavior observations of location and travel times to destinations associated with the offers and discounts. Still other object tracking implementations will be apparent to one skilled in the art.

Through automated BGS analysis, the capabilities of human monitors of these areas may be greatly extended, in some examples allowing one person to monitor increasing numbers of cameras and scenes for public safety issues associated with such object movements. However, challenges may be presented in interpreting scene data acquired from multiple cameras with respect to a common scene. For example, an object alert may be triggered twice from the same object seen in an overlapping view of two cameras, requiring twice the resource expenditure necessary to adjudicate the alert if the data from one of the cameras is sufficient. Tracking an object as it progresses through overlapping views may present challenges, for example the same object found within overlapping images of two cameras may be incorrectly identified and tracked as two different objects, resulting in the generation of erroneous data. The same object or scene may also present different appearance data features via different camera settings and viewpoints, for example different scene illumination based on different vantage points relative to the illumination provided by a light source.

FIG. 1 illustrates a method, system or process according to the present invention for automatically determining field of view overlap among multiple cameras as a function of the temporal overlap of paired portions of object tracks. At 102 a plurality of object tracks are determined for objects detected and tracked in the scenes of each of a plurality of cameras. In some aspects, object tracks are determined at 102 by performing background subtraction (BGS) in each individual camera to recover the objects in the respective scenes. In some aspects, object tracking at 102 includes using object detectors configured to detect objects having certain attributes distinguishable from other objects, for example using vehicle or pedestrian detectors to recover and distinguish respective vehicle or pedestrian objects in the scene from other objects (moving or stationary).

The object tracks each reflect the movement of a tracked object over time through scene image data of each camera. Tracking at 102 may include using a multi-cost optimization framework for tracking objects distinguished in the scenes that incorporates color, distance, size and overlap costs, thus distinguishing and tracking through a plurality of different consecutive image frames an object via discrete frame object images that each have a least cost of association with object images of previous frames of the video data. Some aspects also use geographic constraints of the image scene data to improve tracking; for example, knowledge of roadway structure constraints in the image such as lanes, wall, curbs, etc., may preclude associating frame object images to previous frame images that would represent an impermissible or impossible movement, such as tracking a vehicle object through a building and onto the wrong way of another roadway within a road network having a known geometry.

The object track data may be acquired at 102 in real-time from cameras, sensors, scanners, etc.; or it may be acquired from a database of archived data collected from multiple cameras or other devices and indexed with respect to time of acquisition.

At 104 a value or measure of similarity is computed or otherwise determined for each potential pairing of the tracks across camera pairs based on (as a function of) the appearance information data of the respective objects or their tracks. In some aspects, the similarity value is derived from an object re-identification method that tracks objects through a series of frame data over a tracking time period based on a strength of similarity of object characteristics or features, for example color, size, texture, etc. In some aspects, matching the objects at 104 employs a high-dimensional feature vector composed of histograms of color and texture, for example using red, green and blue channels or Histogram of Oriented Gradients (HOG) features for comparison.

In some aspects, a similarity matrix is built at 104 for different respective values of similarity for each of the object tracks in a first camera view defining a first dimension (axis, row, column, etc.) with respect to each of the object tracks in another (second) camera view as the other dimension (second axis, or complementary column to row, or row to column, etc.), wherein each of the matrix locations is populated with similarity values of the respective track pairings.

In some aspects, an initial greedy approach reduces the number of potential object track pairings at 104 by discarding track pairings having similarity values below a requisite minimum matching percentage, thereby using (populating into the matrix, etc.) only those track pairings for which their respective objects have more than a requisite minimum matching percentage of other value or threshold of similarity. More particularly, if the requisite minimum value of similarity matching percentage is not met with respect to a given track for any of the tracks in the other camera view, then said track is not likely to correspond to object movement seen in the other camera and may be disregarded.

At 106 object track correspondences between paired cameras are determined as a function of the similarity values of respective tracks. More particularly, each of the object tracks of one of a pair of the cameras is assigned to one each of the tracks of the other camera in the pair that has a highest similarity measure with the track from the first camera, for example as corresponding to the highest matrix value determined at 104 for the respective tracks.

At 108 the assigned track pairs are determined to correspond to overlapping portions of fields-of-view of the respective scenes of the paired cameras if portions of the tracks have a temporal overlap (the object appears in each of the tracks at the same time); otherwise, if no portions have a temporal overlap, they are not indicative of an overlapping field-of-view. More particularly, a temporal overlap of an object appearance in the respective camera scenes of tracks assigned into pairs as a function of their highest similarity values at 106 implies that the object being tracked by each track is visible within the views of the two cameras at the same time during a period defined by the length in time of the temporal overlap. Since the object is visible in both cameras during this time period, this implies that the views have a spatial overlapping area of a portion or all of scene image data, wherein objects can be observed by both cameras in the overlapping area during a given common period of time. In contrast, if there is no temporal overlap in appearance of an object tracked by a pair of tracks linked between the different camera views, this implies that the camera view portions of the scenes of the images of these paired cameras traveled through by the object are geographically remote and distinct from each other and do not overlap, as the object is only visible within one while it is not visible within the other camera at the same time.

The boundaries of overlapping fields-of-view of a given pair of cameras are determined by reliably associating objects represented by respective tracks of assigned track pairs corresponding to overlapping fields-of-view in a re-identification process at 110 as a function of their weighted features; determining respective camera scene entry and exit points on the tracks at the beginning and end of the temporal overlap period for the paired camera for a plurality of temporally-overlapping portions of the track pairs assigned for the cameras at 112; and defining boundary lines for overlapping fields-of-view within each camera scene at 114 from the respective determined entry and exit points.

Figure 2:
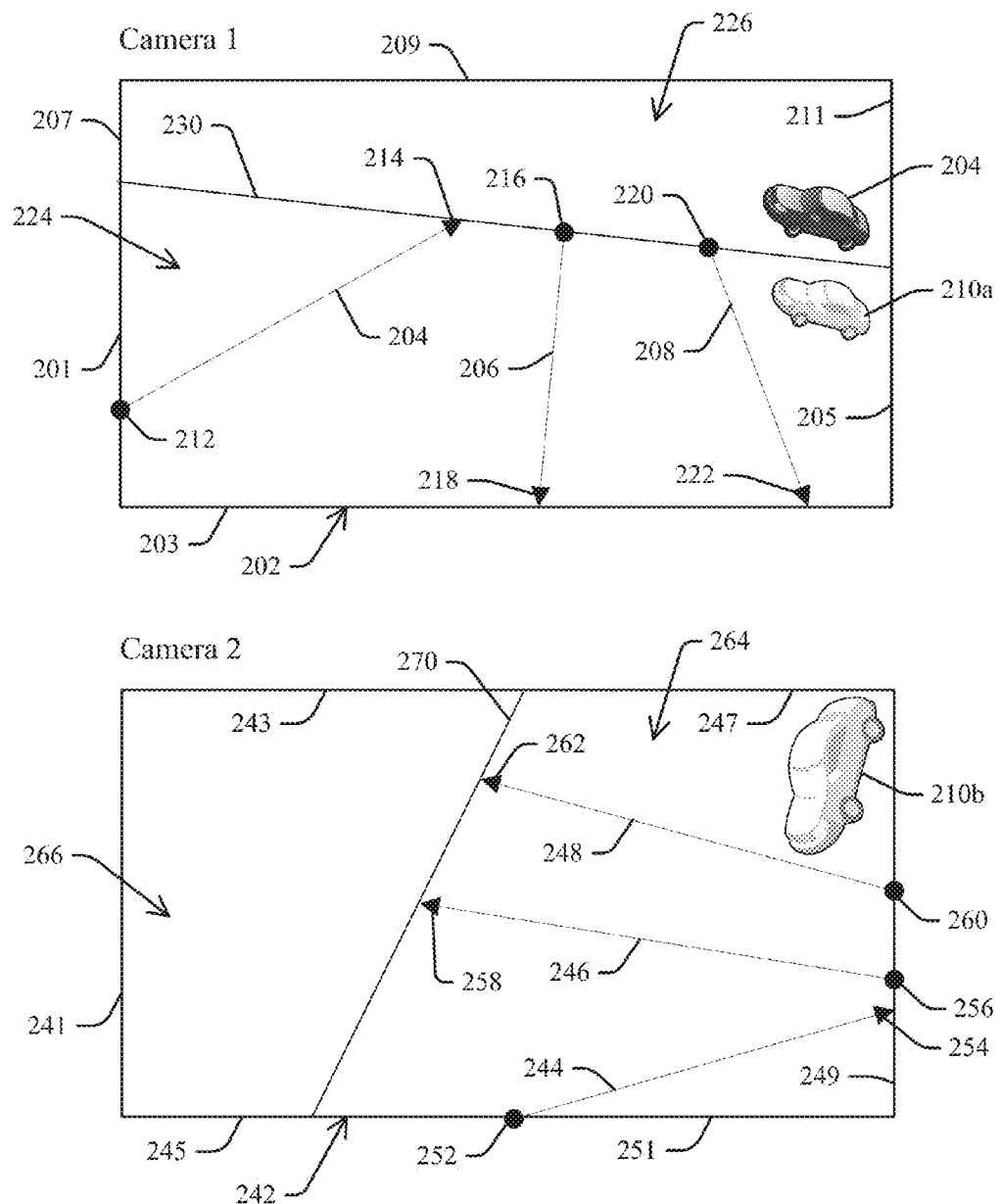
FIG. 2 illustrates a graphical representation of fields-of-view of each of a pair of cameras that are determined to have track pairs with a temporal overlap indicative of overlapping fields-of-view according to the present invention.

FIG. 2 illustrates the field-of view 202 of a first camera (Camera 1) and the field-of view 252 of a second camera (Camera 2) of a pair of cameras determined to have assigned track pairs with a temporal overlap which is indicative of overlapping fields-of-view at 108, FIG. 1. Three object track portions 204, 206 and 208 that have been determined within the scene 202 are assigned to respective, matching and temporally overlapping track portions in the other camera scene 242 data as a function of respective highest similarity values at 106 of FIG. 1: Camera 2 track portion 248 is assigned to Camera 1 track portion 208, Camera 2 track portion 246 is assigned to Camera 1 track portion 206, and Camera 2 track portion 244 is assigned to Camera 1 track portion 204.

The Camera 2 field of view 242 is more zoomed to scene data relative to the field of view 202 of Camera 1. Accordingly, the same automobile 210 object located within an overlap of the fields-of-view 202, 242 will appear as a larger object 210b in the field of view 202 of Camera 1 relative to the other appearance 210a of the same object in the field of view 202 of Camera 1. This illustrates that objects in the overlapping area will have different size feature data found in the respective fields-of-view. However, color data features extracted from object in each view 202 and 242 is consistent, with each of the different 210a and 210b views of the same vehicle object extracting equivalent color values for the white vehicle images 210a and 210b. Accordingly, in this example, size features are given less weight than color features in the re-identification process at 110 that reliably matches up and associates object images occurring at the same time in the views 202 and 242: the color features are more deterministic than the size features in matching objects to each of their respective, paired tracks between the scenes of this pair of cameras.

In FIG. 2 the camera scene entry points of the track portions of their respective temporal overlap periods are illustrated by dots 212, 216, 220, 252, 256 and 260; and the scene exit points for the track portions at the end of their temporal overlap periods are illustrated by arrow-heads 214, 218, 222, 254, 258 and 262. These entry and exit points define linear boundary lines 230 and 270 that demarcate the overlapping portions 224 and 264 of the respective camera fields-of-view 202 and 242 that include the matched tracks 204, 206, 208, 244, 246 and 248 from remainder portions 226 and 266 that do not include overlapping scene image data for the Camera 1 and Camera 2.

The overlapping portion boundary of Camera 1 is a line 230 through the scene 202 that intersects the exit point 214 of track 204, the entry point 216 of track 206 and the entry point 220 of track 208. The entry point 212 of track 204 and exit points 218 and 222 of tracks 206 and 208 are on the outer boundaries defining the extent of the field of view 202. Thus, this sample indicates that objects must be within the overlapping portion 224 bounded by the overlapping boundary line 230 and the outer field-of-view border edge segments 201, 203 and 205 to be visible in both scenes 202 and 242 at any given time. In contrast, any object in the other, remainder portion 226 bounded by the overlapping boundary line 230 and the outer field-of-view border edge segments 207, 209 and 211, such as the black auto 204, will not be visible in any portion of the other Camera 2 scene 242.

Similarly, the overlapping portion boundary of Camera 2 is a line 270 through the scene 242 that intersects the exit points 262 and 258 of tracks 248 and 246. The entry points 260 and 256 of the tracks 248 and 246, and the entry point 252 and exit point 254 of track 244, are on outer boundaries defining the extent of the field of view 242. Thus, this sample indicates that objects, such as the white car 210, within the overlapping portion 264 bounded by the overlapping boundary line 270 and the outer field-of-view border edge segments 247, 249 and 251 will be visible in both scenes 202 and 242 at any given time. Any object in the other, remainder portion 266 bounded by the overlapping boundary line 270 and the outer field-of-view border edge segments 241, 243 and 245, will not be visible in any portion of the other Camera 1 scene 202.

Each of the border lines and outer frame segments are thus defined by respective subsets of the entry and exit points. Though only two points are necessary to define a given linear segment of the overlapping area boundaries, a large set of samples from multiple track entry and exit points will define the boundary line segments with more precision and confidence. In some aspects, a boundary of an overlap of the fields-of-view in a pair of cameras may be found as a line solution determined (fit) using robust regression through all the matching track points determined in the cameras. As will be appreciated by one skilled in the art, larger sets of points may also define other, non-linear boundary shapes, for example arcs, curves, and irregular boundaries formed from pluralities of linear segments, arcs, curves, etc., such as may be defined by occlusions in the field of view encompassing object movements.

At 116 matching appearances of the same object at the same time in the camera pair scenes are re-identified as a function of spatial correlation within the overlapping area boundaries in each camera scene defined at 114. More particularly, the overlap areas determined between respective cameras provide spatial correlation information that is incorporated into object re-identification measures and processes, readjusting feature weightings downward that indicate object matches between cameras that are determine to be in the non-overlapping areas 226 and 266, relative to the features better corresponding to matches, or that confirm matches, within the overlapping areas 224 and 264. If the cameras are fixed with respect to their respective scenes, the spatial correlation information makes the object re-identification process more reliable and consistent across time as feature information may change, for example in response to lighting changes caused by short-term, transient and temporary occlusions and interferences.

Aspects of the present invention may also adapt re-identification processes at 118 to changes in object appearance features over time as a function of new object similarity measures indicated by current object matching within the overlapping areas. More particularly, it is common for lighting conditions in camera views to significantly change over time, for example progressively transitioning through different levels of daytime and nighttime illumination and light quality and color tone every twenty-four hours, or experiencing strong shadow effects cast by fixed structures out of the scene regularly during certain times of the day, sometimes seasonally based on the angle of the sun with the horizon, etc. Such lighting changes and other lighting interferences may not be uniform across both camera views, and this may pose challenges in continuing to use existing re-identification measures established during an earlier different time period. Accordingly, at 118 aspects utilize the spatial correlation information determined at 114 to auto-adapt to new object similarity measures indicated by current object matching within the overlapping areas.

Some aspects also adapt re-identification processes to changes in the overlapping area boundaries caused by camera motion. If the cameras are Pan-Tilt-Zoom (PTZ) cameras, the overlap region may change once one or both cameras are in motion. In such a case, the spatial correlation learned from the previous steps through 114 will change, and may not be useful in associating objects in two camera views. Further, such movements or zooms may result in changes of appearance features in one scene view that are not consistent or otherwise the same in the other camera, for example zooming in by one of the cameras may not only increase the object size in that camera's view but also increase brightness levels of object illumination in the image data in the zoomed-in view, while they remain the same or change by a different value or rate of change in the other camera view.

Accordingly, in some aspects, at 120 an amount of change in relative differences in motion or size are determined for the appearances of a matched object in the overlapping views of each of a pair of cameras over time. Differences in motion may be caused by one of the cameras moving (panning or tilting) while the other camera remains fixed, or otherwise moves in a different fashion. Relative differences in the size of the object, or in a rate of change of size, may be caused by one camera zooming in or out while the other camera does not, or zooms in a different direction or at a different rate of speed.

At 122 a geometric model of the determined relative differences in motion or zooming behavior of the cameras is estimated, and at 124 the estimated geometric model of the camera is applied to the previous overlap boundary lines previously determined at 114 to update or revise the overlapping area boundaries. For example, a matching object tracked in the overlapping view area is observed in both cameras before the field of view of one of the cameras is differentially moved or zoomed. After the movement/zooming feature data is determined or observed for the object in the view, a displacement between the before and after locations of the same object in one of the differentially moved cameras is used to directly update locations of one or more of the boundary lines defining the overlap field-of-view lines for the cameras by a difference in displacement observed in the individual camera scenes. In one example, where the object is stationary and thus remains unmoved in the fixed camera view, the displacement is a simple horizontal/vertical axis coordinate shift based on the object's displacement since the movement of the camera displacement. In another example, where the object is moving in both views, such as where the fields-of-view of the cameras are both moving relative to the object but in different directions or at different rates, the displacement is a difference between a displacement observed in one camera relative to the other camera.

Conventional systems generally require a manual or physical determination of field-of-view overlaps, wherein an administrator manually or directly determines the points of overlap in the respective fields-of-view of both cameras. However, this process is extremely slow and inefficient. Moreover, such determinations do not apply to cameras that independently rotate, move or zoom.

Some conventional systems determine a field-of-view overlap based on a single object in the scenes, which presumes that there is a single object present in the scene at the time of the field-of-view overlap determination. Since there is only a single object present in the scene, there is no object matching problem across the cameras. However, such techniques are not useful or practical for deployments wherein large pluralities of objects may be present within the respective scenes, presenting challenges in the object matching.

Some conventional systems determine fields-of-view (FOV) based on physical location measurements. For example, some cameras may possess internal gyroscopes, and their physical geographical location might be known, or determined via global positioning satellite or cellular device triangulation locations, and wherein this data may be used to compute the overlapping field-of-view locations. However, such approaches require the provision and administration and processing of data from sometimes sophisticated sensors, along with a presumption of known physical locations of such cameras, additional computational and administrative burdens that are otherwise not needed to track objects.

Thus, rather than requiring manual or camera-specific calibrations to define overlapping portions of respective camera views as a function of directly determining their physical locations, etc., aspects of the present invention automatically determine the occurrence and boundaries of overlapping areas directly from tracking and matching objects distinguished in the different camera scene data independent of a need for relative physical location calibrations. Efficiencies are provided in aspects by obviating the need to individually calibrate matching camera relationships via geographic and other data considerations. The data required is already acquired via the primary object distinguishing and tracking processes and components, aspects of the present invention merely reuse the same data to also determine the overlapping scene portions, which may be used to improve the base object re-identification processes as discussed above.

Since the camera pairing relationships can be determined purely from comparing the object tracking data from each as a function of matching objects, recognizing overlapping fields-of-view and responsively tracking given objects may be greatly up-scaled over conventional systems, for example to hundreds of cameras compared to the tens of cameras that other systems may be effectively calibrated and administered manually. Large-scale image matching may also be performed using the sources of cloud computing and other large computing network environments. Aspects do not impose upper limit requirements on targets or site models, but instead use bootstrapping processes that use traffic composed of hundreds of objects to determine, revise and update the overlapping camera relationship determinations. The more camera data provided, the better the probabilistic results, in particular in response to multi-modal distributions of time of object travel.

Recognizing overlapping camera views according to the present invention also improve object matching and retrieval results in the base system. For example, given an estimate of a field-of-view overlap between cameras, a system utilizing the paired cameras can capture images of the same (matched) object from two different angles. A search over one camera can potentially automatically bring up results from the other overlapping camera which might have a better image of the object, for example an automobile license plate might not be visible in the first camera, but could be visible in the second camera.

Digital content creation systems may use the overlapping view to create a three-dimensional image of the matched object when the cameras capture images from different viewpoints useful to approximating stereo imagery that may be used to generate three-dimensional images. Such images may be useful to generating additional information about the matched object, for example integrated circuitry wafer objects may be inspected for defects created in a manufacturing process that are observable from comparing field-of-view image data from two or more angles that are determinative of characteristics of the wafer. A composite image of a matched object may also be generated that provides more information for manual inspection of the object by a human auditor than single images taken alone.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium exclude transitory, propagation or carrier wave signals or subject matter and include an electronic, magnetic, optical or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is not a transitory, propagation or carrier wave signal, but instead may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
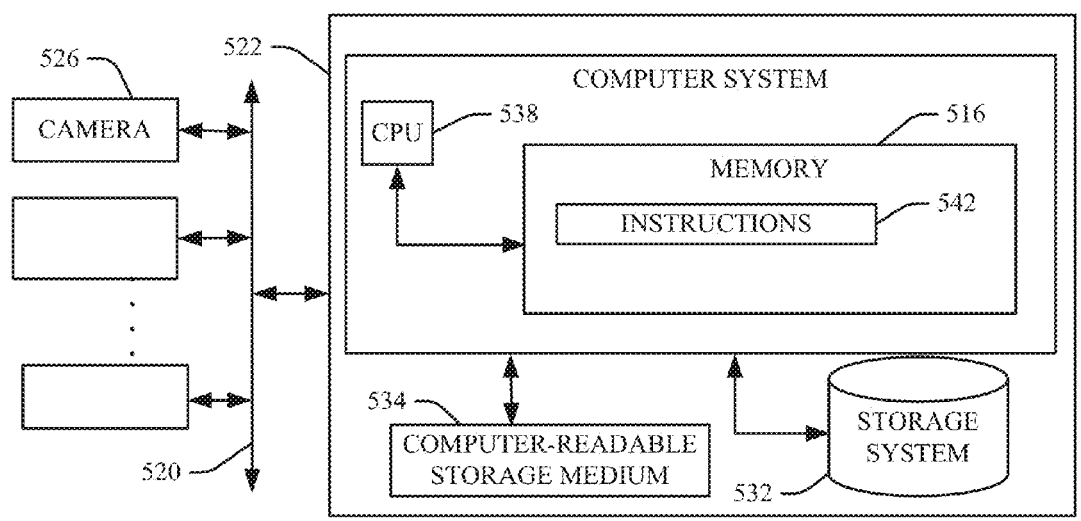
FIG. 3 is a block diagram illustration of a computer system implementation of an aspect of the present invention.

Referring now to FIG. 3, an exemplary computerized implementation of an aspect of the present invention includes a computer system or other programmable device 522 in communication with a plurality of different video image input devices 526 (cameras, video data storage devices, image sensors, etc.) that automatically determines field of view overlap regions among multiple cameras as a function of the temporal overlap of paired portions of object tracks as described above with respect to FIGS. 1 and 2. Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to determine the field of view overlap regions as described above with respect to FIGS. 1 and 2.

The network computing environment 520 may sometimes be referred to as a cloud computing environment that enables a plurality of different computer resources to interact cooperatively, abstracted (in some examples into a cloud layer) so that disparate devices appear to an end-user as a single pool of seamless resources. Examples of computer resources amenable to network computing or cloud environments include physical programmable devices 522 or 526 (for example, programmable imaging devices or cameras, servers, clients, etc.), storage and other memory devices 532 or 534, etc.; and logical computing applications and engines (for example, business and other software applications).

In one aspect, the present invention may also perform process steps of the invention on a subscription, advertising, and/or fee basis. That is, a service provider could offer to integrate computer-readable program code into the computer system 522 to enable the computer system 522 to automatically determine field of view overlap regions among multiple cameras as a function of the temporal overlap of paired portions of object tracks as described above with respect to FIGS. 1 and 2. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatically determining field of view overlap among multiple cameras as a function of the temporal overlap of object tracks, the method comprising:
   determining values of similarity for potential pairings of each of a plurality of object tracks of movements of objects over time through a field-of-view of a first camera with each of a plurality of object tracks of movements of objects over time through a field-of-view of a second camera;
   assigning into pairs each of the object tracks within the first camera field-of-view to ones each of the object tracks within the second camera field-of-view that each have a highest determined similarity value of the similarity values determined for their respective potential pairings;
   determining that the assigned object track pairs correspond to overlapping portions of the fields-of-view of the first and second paired cameras if portions of each of the assigned object track pairs have a temporally overlapping period of time;
   determining scene entry points on each of the tracks of the assigned object track pairs corresponding to the overlapping fields-of-view portions within their fields-of-view as locations of the object on the each of said tracks at a beginning of the temporally overlapping period of time;
   determining scene exit points on each of tracks of the assigned object track pairs corresponding to the overlapping fields-of-view portions within their fields-of-view as locations of the object on the each of said tracks at an ending of the temporally overlapping period of time; and
   defining boundary lines for the overlapping fields-of-view portions within their corresponding first and second camera fields-of-view as a function of the determined entry and exit points in their respective fields-of-view.

2. The method of claim 1, wherein the step of defining the boundary lines comprises determining linear boundary lines through the fields of view that comprise subsets of the determined entry and exit points in the respective fields-of-view.

3. The method of claim 2, wherein the step of defining the boundary lines comprises determining linear solutions using robust regression through the subsets of the determined entry and exit points in the respective fields-of-view.

4. The method of claim 2, wherein the step of assigning into the pairs each of the object tracks that have the highest determined similarity values for their respective potential pairings comprises:
building a similarity matrix for different respective values of similarity comprising a plurality of locations that are each defined as pairings of one each of the object tracks in the first camera view to one each of the object tracks in the second camera view;
populating each of the matrix locations with similarity values of their respective track pairings;
discarding matrix locations populated with similarity values that have similarity values below a requisite minimum threshold value; and
determining the potential pairings as the object tracks corresponding to the populated matrix locations having the highest similarity values.

5. The method of claim 2, further comprising:
readjusting a first feature weighting used to match appearances of objects represented by respective tracks of the assigned object tracks downward relative to a weighting of a second feature used to match the appearances of objects in response to:
the first feature indicating a first match of objects between the first and second camera fields-of-view that is located outside of the overlapping fields-of-view areas defined by the boundary lines; and
the second feature indicating a second match of objects between the first and second camera fields-of-view that is located within the overlapping fields-of-view areas defined by the boundary lines.

6. The method of claim 2, further comprising:
in response to a determined change in a relative difference in motion or size of a matched appearance of an object represented by respective tracks of one of the assigned object track pairs corresponding to the overlapping fields-of-view portions over time, determining a displacement distance between before and after locations of the object in one of the fields of views of the one assigned object track pair; and
updating a location of at least one of the boundary lines within the fields of view of the one assigned object track pair by the determined displacement distance.

7. The method of claim 1, further comprising:
integrating computer-readable program code into a computer system comprising a processing unit, a computer readable memory and a computer readable tangible storage medium; and
wherein the computer readable program code is embodied on the computer readable tangible storage medium and comprises instructions for execution by the processing unit via the computer readable memory to cause the processing unit to perform the steps of determining the value of similarity for the potential pairings of the object tracks, assigning into pairs the object tracks having the highest determined similarity values, determining that the assigned object track pairs correspond to overlapping portions of the fields-of-view if portions of each have the temporally overlapping period of time, determining the scene entry points as the locations of the object on the tracks at the beginning of the temporally overlapping period of time, determining the scene exit points as the locations of the objects on the tracks at the ending of the temporally overlapping period of time, and defining the boundary lines as the function of the determined entry and exit points in their respective fields-of-view.

8. The method of claim 7, wherein the processing unit executes the program instructions stored on the tangible computer-readable storage medium via the computer readable memory and thereby defines the boundary lines by determining linear boundary lines through the fields of views that comprise subsets of the determined entry and exit points in the respective fields-of-view.

9. A system, comprising:
a processing unit in communication with a computer readable memory and a computer-readable storage medium;
wherein the processing unit executes program instructions stored on the computer-readable storage medium via the computer readable memory and thereby:
determines values of similarity for potential pairings of each of a plurality of object tracks of movements of objects over time through a field-of-view of a first camera with each of a plurality of object tracks of movements of objects over time through a field-of-view of a second camera;
assigns into pairs each of the object tracks within the first camera field-of-view to ones each of the object tracks within the second camera field-of-view that each have a highest determined similarity value of the similarity values determined for their respective potential pairings;
determines that the assigned object track pairs correspond to overlapping portions of the fields-of-view of the first and second paired cameras if portions of each of the assigned object track pairs have a temporally overlapping period of time;
determines scene entry points on each of the tracks of the assigned object track pairs corresponding to the overlapping fields-of-view portions within their fields-of-view as locations of the object on the each of said tracks at a beginning of the temporally overlapping period of time;
determines scene exit points on each of tracks of the assigned object track pairs corresponding to the overlapping fields-of-view portions within their fields-of-view as locations of the object on the each of said tracks at an ending of the temporally overlapping period of time; and
defines boundary lines for the overlapping fields-of-view portions within their corresponding first and second camera fields-of-view as a function of the determined entry and exit points in their respective fields-of-view.

10. The system of claim 9, wherein the processing unit executes the program instructions stored on the computer-readable storage medium via the computer readable memory and thereby defines the boundary lines by determining linear boundary lines through the fields of view that comprise subsets of the determined entry and exit points in the respective fields-of-view.

11. The system of claim 10, wherein the processing unit executes the program instructions stored on the computer-readable storage medium via the computer readable memory and thereby defines the boundary lines by determining linear solutions using robust regression through the subsets of the determined entry and exit points in the respective fields-of-view.

12. The system of claim 9, wherein the processing unit executes the program instructions stored on the computer-readable storage medium via the computer readable memory and thereby assigns into the pairs each of the object tracks that have the highest determined similarity values for their respective potential pairings by:
building a similarity matrix for different respective values of similarity comprising a plurality of locations that are each defined as pairings of one each of the object tracks in the first camera view to one each of the object tracks in the second camera view;

populating each of the matrix locations with similarity values of their respective track pairings;

discarding matrix locations populated with similarity values that have similarity values below a requisite minimum threshold value; and determining the potential pairings as the object tracks corresponding to the populated matrix locations having the highest similarity values.

13. The system of claim 9, wherein the processing unit executes the program instructions stored on the computer-readable storage medium via the computer readable memory and thereby further:

readjusts a first feature weighting used to match appearances of objects represented by respective tracks of the assigned object tracks downward relative to a weighting of a second feature used to match the appearances of objects in response to:

the first feature indicating a first match of objects between the first and second camera fields-of-view that is located outside of the overlapping fields-of-view areas defined by the boundary lines; and the second feature indicating a second match of objects between the first and second camera fields-of-view that is located within the overlapping fields-of-view areas defined by the boundary lines.

14. The system of claim 9, wherein the processing unit executes the program instructions stored on the computer-readable storage medium via the computer readable memory and thereby further:

in response to a determined change in a relative difference in motion or size of a matched appearance of an object represented by respective tracks of one of the assigned object track pairs corresponding to the overlapping fields-of-view portions over time, determines a displacement distance between before and after locations of the object in one of the fields of view of the one assigned object track pair; and updates a location of at least one of the boundary lines within the fields of views of the one assigned object track pair by the determined displacement distance.

15. A computer program product for automatically determining field of view overlap among multiple cameras as a function of the temporal overlap of object tracks, the computer program product comprising:

a non-transitory computer readable hardware storage device having computer readable program code embodied therewith, the computer readable program code comprising instructions for execution by a computer processing unit that cause the computer processing unit to:

determine values of similarity for potential pairings of each of a plurality of object tracks of movements of objects over time through a field-of-view of a first camera with each of a plurality of object tracks of movements of objects over time through a field-of-view of a second camera;

assign into pairs each of the object tracks within the first camera field-of-view to ones each of the object tracks within the second camera field-of-view that each have a highest determined similarity value of the similarity values determined for their respective potential pairings;

determine that the assigned object track pairs correspond to overlapping portions of the fields-of-view of the first and second paired cameras if portions of each of the assigned object track pairs have a temporally overlapping period of time;

determine scene entry points on each of the tracks of the assigned object track pairs corresponding to the overlapping fields-of-view portions within their fields-of-view as locations of the object on the each of said tracks at a beginning of the temporally overlapping period of time;

determine scene exit points on each of tracks of the assigned object track pairs corresponding to the overlapping fields-of-view portions within their fields-of-view as locations of the object on the each of said tracks at an ending of the temporally overlapping period of time; and define boundary lines for the overlapping fields-of-view portions within their corresponding first and second camera fields-of-view as a function of the determined entry and exit points in their respective fields-of-view.

16. The computer program product of claim 15, wherein the computer readable program code instructions for execution by the computer processing unit further cause the computer processing unit to define the boundary lines by determining linear boundary lines through the fields of view that comprise subsets of the determined entry and exit points in the respective fields-of-view.

17. The computer program product of claim 16, wherein the computer readable program code instructions for execution by the computer processing unit further cause the computer processing unit to define the boundary lines by determining linear solutions using robust regression through the subsets of the determined entry and exit points in the respective fields-of-view.

18. The computer program product of claim 16, wherein the computer readable program code instructions for execution by the computer processing unit further cause the computer processing unit to assign into the pairs each of the object tracks that have the highest determined similarity values for their respective potential pairings by:

building a similarity matrix for different respective values of similarity comprising a plurality of locations that are each defined as pairings of one each of the object tracks in the first camera view to one each of the object tracks in the second camera view;

populating each of the matrix locations with similarity values of their respective track pairings;

discarding matrix locations populated with similarity values that have similarity values below a requisite minimum threshold value; and determining the potential pairings as the object tracks corresponding to the populated matrix locations having the highest similarity values.

19. The computer program product of claim 16, wherein the computer readable program code instructions for execution by the computer processing unit further cause the computer processing unit to:

readjust a first feature weighting used to match appearances of objects represented by respective tracks of the assigned object tracks downward relative to a weighting of a second feature used to match the appearances of objects in response to:

the first feature indicating a first match of objects between the first and second camera fields-of-view that is located outside of the overlapping fields-of-view areas defined by the boundary lines; and the second feature indicating a second match of objects between the first and second camera fields-of-view that is located within the overlapping fields-of-view areas defined by the boundary lines.

20. The computer program product of claim 16, wherein the computer readable program code instructions for execution by the computer processing unit further cause the computer processing unit to:

in response to a determined change in a relative difference in motion or size of a matched appearance of an object represented by respective tracks of one of the assigned object track pairs corresponding to the overlapping fields-of-view portions over time, determine a displacement distance between before and after locations of the object in one of the fields of view of the one assigned object track pair; and update a location of at least one of the boundary lines within the fields of views of the one assigned object track pair by the determined displacement distance.

* * * * *